(12) United States Patent
Kim et al.

(10) Patent No.: US 10,796,437 B2
(45) Date of Patent: Oct. 6, 2020

(54) SYSTEM AND METHOD FOR SIMULTANEOUSLY RECONSTRUCTING INITIAL 3D TRAJECTORY AND VELOCITY OF OBJECT BY USING SINGLE CAMERA IMAGES

(71) Applicant: Electronics and Telecommunications Research Institute, Daejeon (KR)

(72) Inventors: Jong Sung Kim, Daejeon (KR); Myung Gyu Kim, Daejeon (KR); Woo Suk Kim, Daejeon (KR); Seong Min Baek, Daejeon (KR); Sang Woo Seo, Daejeon (KR); Sung Jin Hong, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 208 days.

(21) Appl. No.: 16/016,844

(22) Filed: Jun. 25, 2018

(65) Prior Publication Data
US 2019/0164295 A1    May 30, 2019

(30) Foreign Application Priority Data
Nov. 29, 2017  (KR) .......................... 10-2017-0162028

(51) Int. Cl.
G06T 7/246  (2017.01)
G06T 7/73  (2017.01)
G06T 7/55  (2017.01)

(52) U.S. Cl.
CPC ............... *G06T 7/246* (2017.01); *G06T 7/55* (2017.01); *G06T 7/73* (2017.01);
(Continued)

(58) Field of Classification Search
None
See application file for complete search history.

(56) References Cited

U.S. PATENT DOCUMENTS

| 5,434,789 A | * | 7/1995 | Fraker | A63B 24/0021 |
| | | | | 473/407 |
| 2011/0025845 A1 | | 2/2011 | Han et al. | |

(Continued)

FOREIGN PATENT DOCUMENTS

| KR | 10-2011-0012626 | 2/2011 |
| KR | 10-1019782 | 3/2011 |

(Continued)

OTHER PUBLICATIONS

Shai Avidan et al.; "Trajectory Triangulation: 3D Reconstruction of Moving Points from a Monocular Image Sequence"; IEEE Transactions on Pattern Analysis and Machine Intelligence; Apr. 2000, vol. 22, No. 4, pp. 348-357.

(Continued)

*Primary Examiner* — Casey L Kretzer
(74) *Attorney, Agent, or Firm* — Kile Park Reed & Houtteman PLLC

(57) ABSTRACT

Provided are a system and method for simultaneously reconstructing an initial three-dimensional (3D) trajectory and velocity of an object by using single camera images. The system for simultaneously reconstructing an initial 3D trajectory and velocity of an object by using single camera images includes a receiver configured to receive 3D world coordinate information of a starting point of an object and object-captured image information of a single camera, a two-dimensional (2D) coordinate acquisition unit configured to acquire 2D image coordinates of the object from the object-captured image information, and a reconstructor configured to simultaneously reconstruct an initial 3D velocity and trajectory of the object by applying a 3D motion (Continued)

equation to the 2D image coordinates and depth information from the single camera to the object.

13 Claims, 7 Drawing Sheets

(52) U.S. Cl.
CPC ............ *G06T 2207/10016* (2013.01); *G06T 2207/30224* (2013.01); *G06T 2207/30241* (2013.01)

(56) References Cited

U.S. PATENT DOCUMENTS

| | | | |
|---|---|---|---|
| 2011/0187828 A1 | 8/2011 | Kim et al. | |
| 2012/0082342 A1 | 4/2012 | Kim et al. | |
| 2013/0058532 A1 | 3/2013 | White et al. | |
| 2014/0301598 A1* | 10/2014 | Marty | G06T 7/246 |
| | | | 382/103 |
| 2015/0169979 A1 | 6/2015 | Ko et al. | |
| 2017/0256063 A1 | 9/2017 | Baek et al. | |
| 2018/0348249 A1* | 12/2018 | Kawamoto | G01B 11/002 |
| 2019/0147219 A1* | 5/2019 | Thornbrue | G06K 9/00208 |
| | | | 348/169 |

FOREIGN PATENT DOCUMENTS

| | | |
|---|---|---|
| KR | 10-2011-0064544 | 6/2011 |
| KR | 10-2011-0089021 | 8/2011 |
| KR | 10-2012-0035021 | 4/2012 |
| KR | 10-1231387 | 2/2013 |
| KR | 10-1244044 | 3/2013 |
| KR | 10-2014-0122560 | 10/2014 |
| KR | 10-2016-0090632 | 8/2016 |
| KR | 10-2017-0103365 | 9/2017 |

OTHER PUBLICATIONS

Hyun Soo Park et al.; "3D Reconstruction of a Moving Point from a Series of 2D Projections"; European Conference on Computer Vision, Sep. 2010; pp. 1-14.

* cited by examiner

SYSTEM AND METHOD FOR SIMULTANEOUSLY RECONSTRUCTING INITIAL 3D TRAJECTORY AND VELOCITY OF OBJECT BY USING SINGLE CAMERA IMAGES

CROSS-REFERENCE TO RELATED APPLICATION

This application claims priority to and the benefit of Korean Patent Application No. 2017-0162028, filed on Nov. 29, 2017, the disclosure of which is incorporated herein by reference in its entirety.

BACKGROUND

1. Field of the Invention

The present invention relates to a system and method for simultaneously reconstructing an initial three-dimensional (3D) trajectory and velocity of an object on the basis of a single camera.

2. Discussion of Related Art

A related art for reconstructing an initial 3D trajectory and velocity of a ball employs a multi-camera method. The multi-camera method has drawbacks in that it is necessary to use multiple cameras which are mutually synchronized and mutually calibrated with precision in advance, simultaneously track two-dimensional (2D) positions of the ball in multiple camera images acquired from the multiple cameras, and reconstruct 3D positions of the ball corresponding to the 2D positions of the ball tracked in the multiple camera images through complex 3D triangulation.

SUMMARY OF THE INVENTION

The present invention is directed to providing a system and method for simultaneously reconstructing an initial three-dimensional (3D) trajectory and velocity of an object by applying a 3D motion equation to two-dimensional (2D) positions of the object tracked in single camera images captured by a single camera without complex mutual synchronization, mutual calibration, and triangulation processes.

According to an aspect of the present invention, there is provided a system for simultaneously reconstructing an initial 3D trajectory and velocity of an object by using single camera images, the system including: a receiver configured to receive 3D world coordinate information of a starting point of an object and object-captured image information of a single camera; a 2D coordinate acquisition unit configured to acquire 2D image coordinates of the object from the object-captured image information; and a reconstructor configured to simultaneously reconstruct an initial 3D velocity and trajectory of the object by applying a 3D motion equation to the 2D image coordinates and depth information from the single camera to the object.

According to another aspect of the present invention, there is provided a method of simultaneously reconstructing an initial 3D trajectory and velocity of an object by using single camera images, the method including: establishing a 3D motion equation having an initial 3D velocity of an object and a depth of 3D world coordinates of the object as variables; calculating 2D image coordinates of object-passing points by using photography information of a single camera, and calculating a 3D direction vector of the object; and finding solutions to the 3D motion equation by using the 2D image coordinates and the 3D direction vector of the object, and reconstructing an initial 3D velocity and trajectory of the object.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
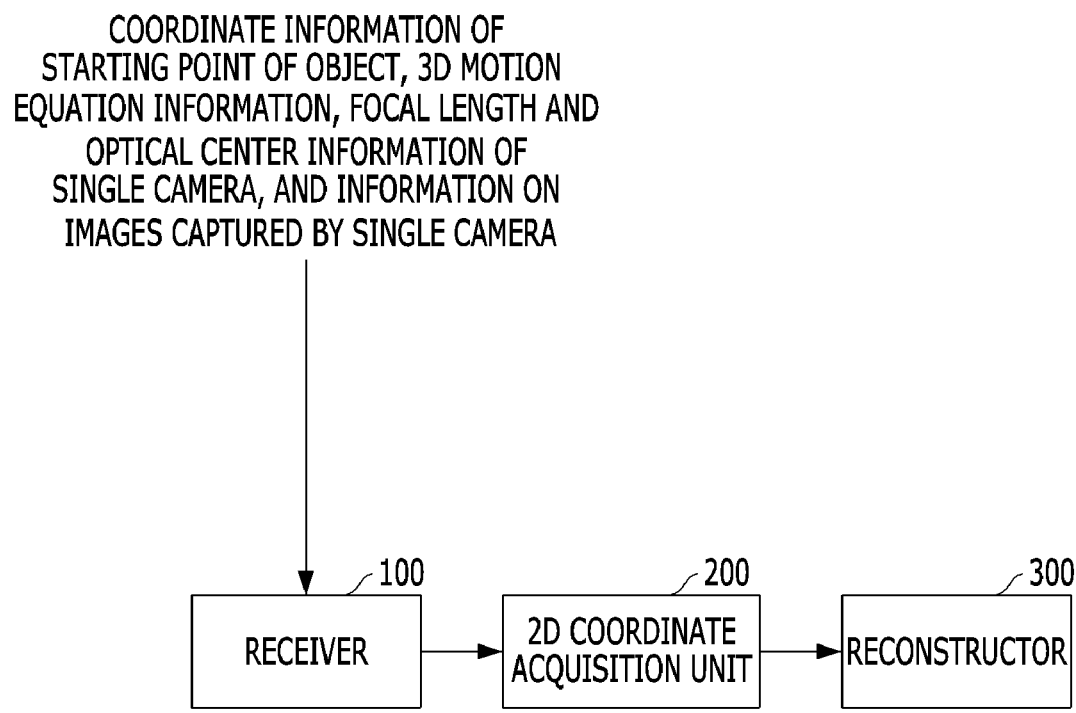
FIG. 1 is a block diagram of a system for simultaneously reconstructing an initial three-dimensional (3D) trajectory and velocity of an object by using single camera images according to an exemplary embodiment of the present invention.

The aforementioned objects of the present invention, other objects, advantages, characteristics, and methods for achieving them will become apparent with reference to exemplary embodiments described in detail below together with the accompanying drawings.

The present invention may, however, be embodied in various different forms and is not limited to the exemplary embodiments set forth herein. The following exemplary embodiments are provided only to easily disclose the objects, configurations, and effects of the present invention to those of ordinary skill in the art to which the present invention pertains, and the scope of the present invention is defined by the claims.

Meanwhile, the terminology used herein is for the purpose of describing embodiments only and is not intended to limit the present invention. As used herein, singular terms are intended to include the plural forms as well unless the context clearly indicates otherwise. It will be further understood that the terms "comprises" and/or "comprising", when used herein, do not preclude the presence or addition of one or more elements, steps, operations, and/or devices other than stated elements, steps, operations, and/or devices.

First, a background of proposing the present invention will be described below to help those of ordinary skill in the art to understand the present invention, and then exemplary embodiments of the present invention will be described.

A virtual ball sports system simulates a three-dimensional (3D) trajectory of a ball kicked or hit by a player, thereby enabling the player to virtually experience or train for ball sports techniques such as a soccer kick, a golf shot, and the like.

To simulate a 3D trajectory of a ball, initial 3D velocity of the ball is necessary, and the initial 3D velocity of the ball may be calculated by reconstructing an initial 3D trajectory of the ball.

To reconstruct an initial 3D trajectory and velocity of a ball, a multi-camera method of installing two or more cameras, that is, multiple cameras, such as a stereo camera, mutually synchronized and mutually calibrated with precision in advance at points through which a ball passes, capturing multiple camera images with the installed cameras, simultaneously tracking two-dimensional (2D) positions of the ball in the captured multiple camera images, reconstructing 3D positions of the ball corresponding to the 2D positions of the ball tracked in the multiple camera images through triangulation, and calculating an initial 3D velocity of the ball from an initial 3D trajectory of the ball obtained by connecting the reconstructed 3D positions of the ball is generally used.

However, such a multi-camera method involves tracking 2D positions of a ball in images acquired from multiple cameras which are mutually synchronized and mutually calibrated and then reconstructing a 3D trajectory and velocity of the ball through triangulation, and thus the process is complicated.

The present invention is proposed to solve the aforementioned problem and relates to a system and method, which may be applied to a virtual ball sports system enabling a person to virtually experience and train for ball sports techniques such as a soccer kick and a golf shot, for simultaneously reconstructing an initial 3D ball velocity and trajectory required for 3D ball trajectory simulation on the basis of single camera images acquired from a single camera.

FIG. 1 is a block diagram of a system for simultaneously reconstructing an initial 3D trajectory and velocity of an object by using single camera images according to an exemplary embodiment of the present invention.

A system for simultaneously reconstructing an initial 3D trajectory and velocity of an object by using single camera images according to an exemplary embodiment of the present invention includes a receiver 100 which receives 3D world coordinate information of a starting point of an object and object-captured image information of a single camera, a 2D coordinate acquisition unit 200 which acquires 2D image coordinates of the object from the object-captured image information, and a reconstructor 300 which simultaneously reconstructs an initial 3D velocity and trajectory of the object by applying a 3D motion equation to the 2D image coordinates and a depth from the single camera to the object.

FIG. 1 shows that the receiver 100 receives 3D world coordinate information of a starting point of an object, 3D motion equation information, focal length and optical center information of a single camera, and image information captured by the single camera. However, this is an example for describing an exemplary embodiment of the present invention, and such received information is not only transferred to the 2D coordinate acquisition unit 200 and the reconstructor 300 through the receiver 100.

For example, the 3D motion equation information may be stored in the reconstructor 300 and called when it is necessary to reconstruct an initial 3D ball trajectory and velocity.

The receiver 100 according to an exemplary embodiment of the present invention receives object-captured image information including information on the focal length of the single camera, an actual diameter of the object, and a diameter of the object observed in an image captured by the single camera.

In other words, the object-captured image information has a concept not only including images themselves acquired by a single camera but also including data required to simultaneously reconstruct an initial 3D trajectory and velocity of an object. A detailed exemplary embodiment in which an initial 3D ball trajectory and velocity are simultaneously reconstructed by using object-captured image information will be described below.

Figure 2:
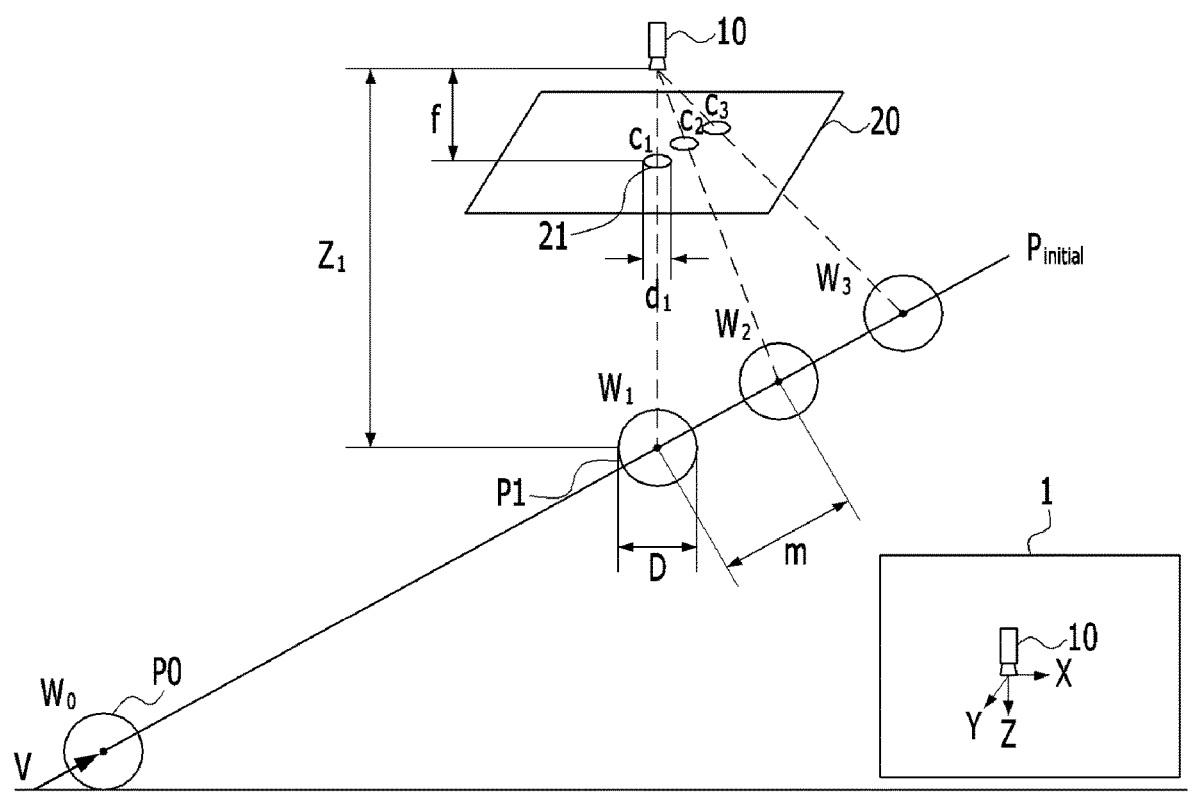
FIG. 2 is a diagram showing the case of acquiring information to simultaneously reconstruct an initial 3D trajectory and velocity of an object on the basis of single camera images according to an exemplary embodiment of the present invention.

The 2D coordinate acquisition unit 200 according to an exemplary embodiment of the present invention acquires 2D image coordinates c of the object by using optical center information of the single camera and 2D pixel coordinates of object-passing points (points corresponding to 3D world coordinates $W_1$, $W_2$, $W_3$ of FIG. 2) detected when the object passes through an imaging range of the single camera.

The reconstructor 300 according to an exemplary embodiment of the present invention reconstructs 3D world coordinates of the object-passing points by using the 2D image coordinates c and the object-captured image information.

A 3D motion equation according to an exemplary embodiment of the present invention includes a direction vector of an object velocity calculated by using the 3D world coordinate information ($W_0$ of FIG. 2) of the starting point of the object and 3D world coordinates ($W_1$ of FIG. 2) of an object-passing point (a first passing point of the object captured by the single camera) and includes a depth of 3D world coordinates and an initial 3D velocity of the object as variables.

The reconstructor 300 according to an exemplary embodiment of the present invention simultaneously calculates a depth value of 3D world coordinates of an object-passing point and an initial 3D velocity value of the object by using a linear system, which is obtained by accumulating 3D motion equations for consecutive object-passing points, thereby reconstructing the initial 3D trajectory and velocity of the object.

Simultaneous reconstruction of an initial 3D trajectory and velocity of an object based on a single camera will be described in detail below with reference to FIG. 2.

Depth from Single Camera to Ball

FIG. 2 is a diagram showing the case of acquiring information to simultaneously reconstruct an initial 3D trajectory and velocity of an object on the basis of single camera images according to an exemplary embodiment of the present invention.

As described above, according to an exemplary embodiment of the present invention, a single camera 10 is used. Therefore, unlike the related art, complex mutual synchronization, mutual calibration, and triangulation processes required to use multiple cameras are unnecessary.

All 3D world coordinates illustrated in FIG. 2 are defined in a camera-centered 3D world coordinate system 1 shown on the lower right side of FIG. 2.

When a diameter of a ball whose actual diameter is D mm is observed to be d pixels in single camera images 20 captured by the single camera 10 whose focal length is f, a depth Z mm from the single camera 10 to the ball satisfies a proportional relationship shown in Expression 1 below.

$$f:d = Z:D \quad \text{[Equation 1]}$$

The focal length f is an internal parameter of the single camera and is calculated in advance through camera internal calibration.

Various camera internal calibration methods have been suggested in the related field, and one of the methods is used.

Here, the diameter d of the ball is a value that may be calculated in the single camera images 20 only once through a ball detection process.

According to the present invention, 3D world coordinates of a starting point and a first passing point are used to acquire 3D world coordinates of following consecutive passing points and reconstruct a trajectory. Therefore, the diameter d of the ball may be calculated from a reference number 21 only once.

Various methods of detecting a ball including a center point and a diameter of the ball have been suggested in the related field, and one of the methods is used.

However, since it takes a long time to detect a ball including a center point and a diameter of the ball, the present invention employs a ball tracking technique, such as the single camera images 20 of FIG. 2, which is only applied to first ball detection and does not consume a long time thereafter (various ball tracking techniques have been suggested in the related field, and one of the techniques is used).

However, the ball tracking technique only allows calculation of a center point of the ball and does not allow calculation of a diameter of the ball. This is because, as described above, it is unnecessary to calculate a diameter of the ball with respect to passing points following the first passing point.

When the focal length f of the single camera 10, the actual diameter D of the ball, and the diameter d of the ball observed in the single camera images 20 are acquired, the depth Z from the single camera 10 to the ball is calculated as shown in Equation 2 below.

$$Z = f\frac{D}{d} \quad \text{[Equation 2]}$$

2. 3D World Coordinates of Ball Starting Point and Ball Passing Points

When a ball is placed at a base for hitting, 3D world coordinates of a ball starting point may be defined to be a 3×1 vector $W_0$ as shown in the following equation.

$$W_0 = \begin{pmatrix} X_0 \\ Y_0 \\ Z_0 \end{pmatrix} \quad \text{[Equation 3]}$$

When a person repeatedly practices kicking, shooting, etc. through virtual ball sports training, such as soccer kick training and golf shot training, the ball starting point is determined, and thus it is possible to simply measure the 3D world coordinates $W_0$ of the ball starting point.

Next, 3D world coordinates of a ball passing point which is detected for the first time when the ball passes through an imaging range of the camera after departure may be defined to be a 3×1 vector $W_1$ as shown in the following equation.

$$W_1 = \begin{pmatrix} X_1 \\ Y_1 \\ Z_1 \end{pmatrix} = Z_1 \begin{pmatrix} X_1/Z_1 \\ Y_1/Z_1 \\ 1 \end{pmatrix} = Z_1 \begin{pmatrix} x_1 \\ y_1 \\ 1 \end{pmatrix} = Z_1 c_1 \quad \text{[Equation 4]}$$

Here, $Z_1$ is a depth value from the single camera to the ball, and $c_1$ is a 3×1 vector indicating 2D image coordinates of a ball center point. When the ball whose actual diameter is D has a diameter $d_1$ in an image in Equation 2, the depth $Z_1$ from the single camera whose focal length is f to the ball may be calculated as shown in Equation 5 below on the basis of Equation 2.

$$Z_1 = f\frac{D}{d_1} \quad \text{[Equation 5]}$$

The 2D image coordinates $c_1$ of the ball center point 160 in Equation 4 may be calculated from an internal structure of the camera as shown in Equation 6 below.

$$c_1 = \begin{pmatrix} x_1 \\ y_1 \\ 1 \end{pmatrix} = \begin{pmatrix} \frac{p_1 - p_0}{f} \\ \frac{q_1 - q_0}{f} \\ 1 \end{pmatrix} \quad \text{[Equation 6]}$$

Here, $(p_1, q_1)$ are 2D pixel coordinates of a ball center point P1, and $(p_0, q_0)$ indicate an optical center of the camera, which is a value calculated in advance as an internal parameter of the camera through camera internal calibration like the focal length f.

3D world coordinates of a ball passing point which is detected for the second time when the ball passes through the imaging range of the single camera 10 may be likewise defined to be a 3×1 vector $W_2$ as shown in Equation 7 below.

$$W_2 = \begin{pmatrix} X_2 \\ Y_2 \\ Z_2 \end{pmatrix} = Z_2 \begin{pmatrix} X_2/Z_2 \\ Y_2/Z_2 \\ 1 \end{pmatrix} = Z_2 \begin{pmatrix} x_2 \\ y_2 \\ 1 \end{pmatrix} = Z_2 c_2 \quad \text{[Equation 7]}$$

Here, 2D image coordinates $c_2$ of a ball center point passing through the second passing point may be calculated as shown in Equation 8 below.

$$c_2 = \begin{pmatrix} x_2 \\ y_2 \\ 1 \end{pmatrix} = \begin{pmatrix} \frac{p_2 - p_o}{f} \\ \frac{q_2 - q_o}{f} \\ 1 \end{pmatrix} \quad \text{[Equation 8]}$$

Also, 3D world coordinates of an $n^{th}$ ball passing point which is observed when the ball passes through the imaging range of the single camera 10 may be likewise defined to be a 3×1 vector $W_n$ as shown in Equation 9 below.

$$W_n = \begin{pmatrix} X_n \\ Y_n \\ Z_n \end{pmatrix} = Z_n \begin{pmatrix} X_n/Z_n \\ Y_n/Z_n \\ 1 \end{pmatrix} = Z_n \begin{pmatrix} x_n \\ y_n \\ 1 \end{pmatrix} = Z_n c_n \qquad \text{[Equation 9]}$$

Here, 2D image coordinates $c_n$ of a ball center point passing through the $n^{th}$ passing point may be calculated as shown in Equation 10 below.

$$c_n = \begin{pmatrix} x_n \\ y_n \\ 1 \end{pmatrix} = \begin{pmatrix} \frac{p_n - p_o}{f} \\ \frac{q_n - q_o}{f} \\ 1 \end{pmatrix} \qquad \text{[Equation 10]}$$

3. 3D Motion Equation and Simultaneous Reconstruction of Initial 3D Trajectory and Velocity An initial 3D trajectory $P_{initial}$ of the ball is defined to be a trajectory connecting the initial starting point (P0) $W_0$ of the ball and initial passing points $W_1, W_2, \ldots,$ and $W_n$ as shown in Equation 11 below.

$$P_{initial} = (W_0, W_1, W_2, \ldots, W_n) \qquad \text{[Equation 11]}$$

Since the ball initially has linear movement at a uniform linear velocity v, the initial 3D trajectory $P_{initial}$ of the ball may be a 3D line rather than a 3D curve.

Also, since the initial passing points $W_1, W_2, \ldots,$ and $W_n$ of the ball are observed by the camera at identical time intervals t, a 3D motion equation as shown in Equation 12 below may be applied to a relationship among the initial passing points $W_1, W_2, \ldots,$ and $W_n$ of the ball.

$$\begin{cases} W_2 = W_1 + m \\ \vdots \\ W_n = W_1 + (n-1)m \end{cases} \qquad \text{[Equation 12]}$$

As shown in FIG. 2, m is a distance between passing points that the ball moves and may be defined to be a 3×1 vector as shown in Equation 13 below.

$$m = \begin{pmatrix} m_x \\ m_y \\ m_z \end{pmatrix} \qquad \text{[Equation 13]}$$

Also, the distance m of the ball has a relationship with the initial 3D velocity v of the ball as shown in Equation 14 below.

$$m = vt \qquad \text{[Equation 14]}$$

Here, t is a time difference between passing points which is determined according to a photographing speed of the camera. The initial 3D velocity v of the ball may be defined to be a 3×1 vector as shown in Equation 15 below.

$$v = \begin{pmatrix} v_x \\ v_y \\ v_z \end{pmatrix} \qquad \text{[Equation 15]}$$

The initial 3D velocity v of the ball is defined to be a relationship between an initial velocity S of the ball and an initial 3D direction u of the ball as shown in Equation 16 below.

$$v = Su \qquad \text{[Equation 16]}$$

Here, the initial 3D direction u of the ball may be defined as a 3×1 vector as shown in Equation 17 below.

$$u = \begin{pmatrix} u_x \\ u_y \\ u_z \end{pmatrix} \qquad \text{[Equation 17]}$$

Here, the initial 3D direction u of the ball may be calculated from the initial starting point (P0) $W_0$ of the ball and the first passing point (P1) $W_1$ as shown in Equation 18 below.

$$u = \frac{W_1 - W_0}{\|W_1 - W_0\|} \qquad \text{[Equation 18]}$$

The 3D motion equation may be defined again through the above equations as shown in Equation 19 below.

$$\begin{cases} Z_2 c_2 - Sut = Z_1 c_1 \\ \vdots \\ Z_n c_n - (n-1)Sut = Z_1 c_1 \end{cases} \qquad \text{[Equation 19]}$$

Here, the first depth $Z_1$ of the ball may be calculated as shown in Equation 5, and the 2D image coordinates $c_1, c_2, \ldots, c_n$ of center points of the ball may be calculated as shown in Equation 6, Equation 8, and Equation 10, respectively. Also, the initial direction u of the ball may be calculated as shown in Equation 18. Therefore, a 3n×n linear system for calculating depths $Z_2, \ldots,$ and $Z_n$ of the ball and the initial velocity S of the ball may be defined from Equation 19 as follows.

$$AX = b \qquad \text{[Equation 20]}$$

In Equation 20, A is defined to be a 3n×n matrix as shown in the following equation.

$$A = \begin{bmatrix} c_2 & 0 & \ldots & 0 & -ut \\ 0 & c_3 & \ldots & 0 & -2ut \\ \vdots & \vdots & \ddots & \vdots & \vdots \\ 0 & 0 & \ldots & c_n & -(n-1)ut \end{bmatrix} \qquad \text{[Equation 21]}$$

b is a 3n×1 vector and defined as shown in Equation 22 below.

$$b = \begin{pmatrix} Z_1 c_1 \\ \vdots \\ Z_1 c_1 \end{pmatrix} \qquad \text{[Equation 22]}$$

X is an n×1 vector and defined as shown in Equation 23 below.

$$X = \begin{pmatrix} Z_2 \\ \vdots \\ Z_n \\ S \end{pmatrix} \quad \text{[Equation 23]}$$

The solution X to the defined 3n×n linear system is calculated as follows.

$$X = A^+ b \quad \text{[Equation 24]}$$

Here, $A^+$ is a pseudoinverse matrix of the 3n×n linear system A and calculated to be an n×n matrix as shown in the following equation.

$$A^+ = (A^T A)^{-1} A^T \quad \text{[Equation 25]}$$

Therefore, according to an exemplary embodiment of the present invention, when the focal length f and the optical center $(p_0, q_0)$ of the single camera 10 are calculated through internal calibration and the initial starting point $W_0$ and the first passing point $W_1$ of the ball and the 2D image coordinates $c_1, c_2, \ldots, c_n$ of center points of the ball are measured, it is possible to effectively and simultaneously reconstruct the initial 3D trajectory $P_{initial} = (W_0, W_1, W_2, \ldots, \text{and } W_n)$ of the ball and the initial 3D velocity v of the ball in the camera-centered 3D world coordinate system 1 from the single camera images 20 acquired from the single camera 10.

Figure 3:
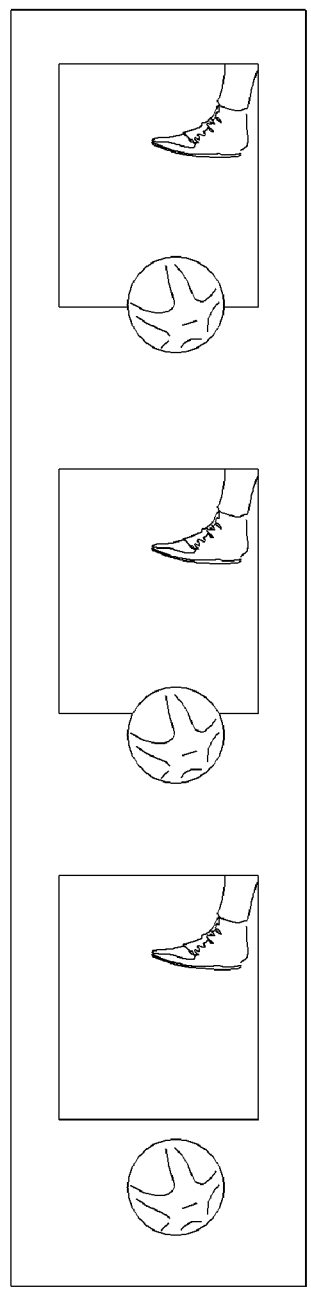
FIG. 3 shows single camera images of an actual soccer kick according to an exemplary embodiment of the present invention.

FIG. 3 shows single camera images of an actual soccer kick according to an exemplary embodiment of the present invention.

As shown in FIG. 3, first, second, and third passing points of a ball were captured through a single camera. Here, the time difference t between the passing points is 6.24 ms, which is determined according to a photographing speed of the camera.

Figure 4:
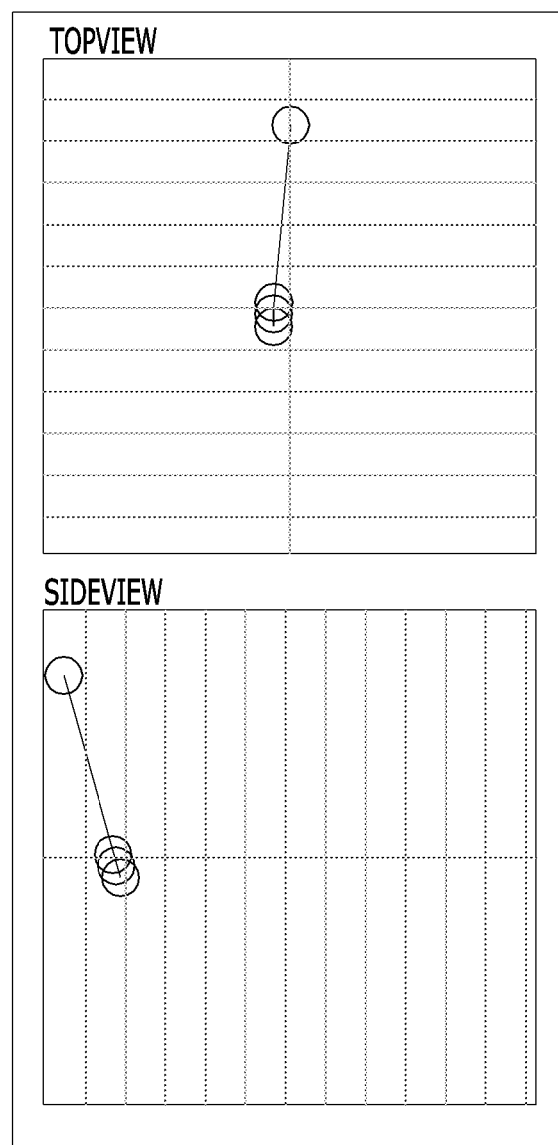
FIG. 4 shows results of reconstructing a 3D trajectory and velocity of an actual ball from the single camera images shown in FIG. 3.

FIG. 4 shows results of reconstructing a 3D trajectory and velocity of an actual ball from the single camera images shown in FIG. 3.

In the two graphs of a top view and a side view, red circles show 3D world coordinates of a starting point and passing points of the ball, and green lines show a reconstructed initial 3D trajectory of the ball. Here, the distance m between the passing points that the ball moved was 78.1 mm, and the initial velocity S of the ball was reconstructed to be 45.038 km/h. From the reconstructed initial 3D direction u of the ball, an elevation angle and an azimuth angle were calculated to be 16.778 degrees and 5.334 degrees, respectively.

The system reconstructs an initial 3D ball trajectory and velocity with regard to a soccer kick or a golf shot through a single camera, thereby allowing 3D ball trajectory simulation.

The proposed method makes it possible to reconstruct an initial 3D ball trajectory and velocity required for 3D ball trajectory simulation not by using multiple cameras but by using a single camera.

Figure 5:
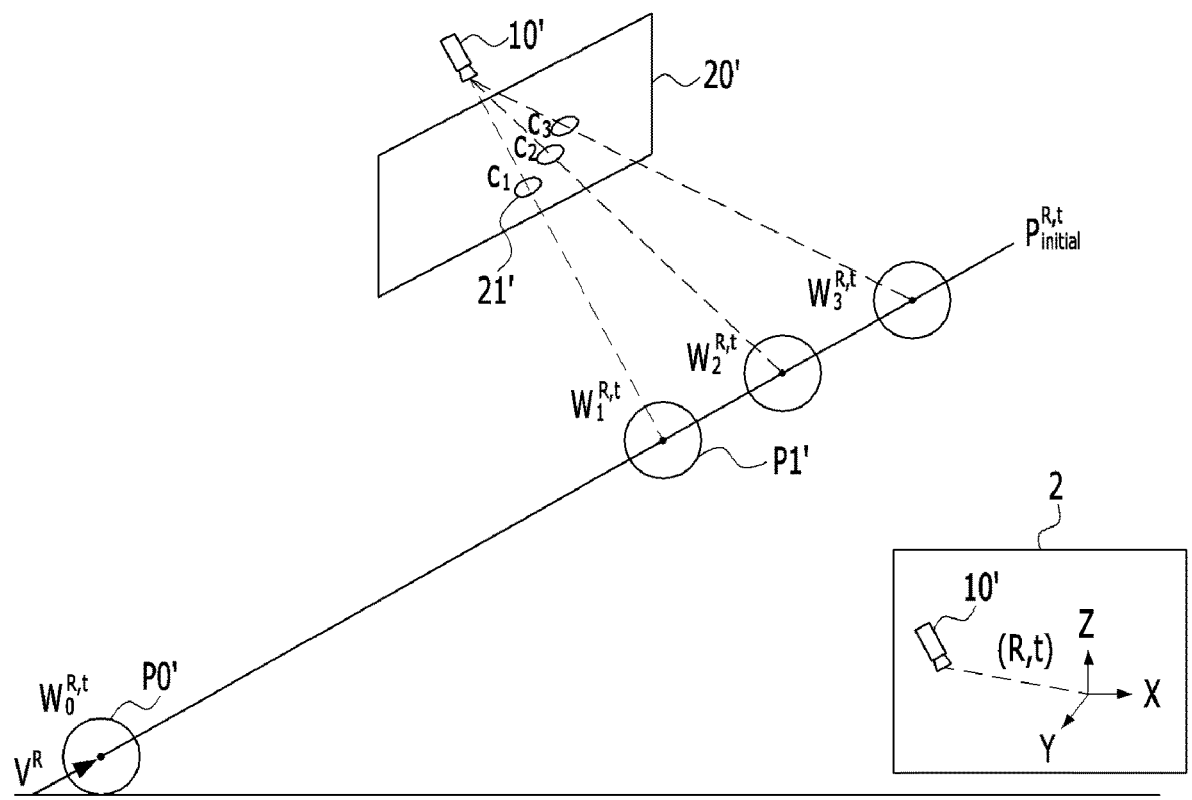
FIG. 5 is a diagram showing the case of acquiring information to reconstruct a 3D trajectory and velocity of an object when a single camera moves and rotates according to another exemplary embodiment of the present invention.

FIG. 5 is a diagram showing the case of acquiring information to simultaneously reconstruct a 3D trajectory and velocity of an object when a single camera moves and rotates according to another exemplary embodiment of the present invention.

When a single camera 10' rotates and moves in a 3D space, it is possible to reconstruct an initial 3D trajectory and velocity of a ball in a noncamera-centered 3D world coordinate system 2 as follows.

Here, rotation and movement of the single camera 10' in the noncamera-centered 3D world coordinate system 2 may be calculated in advance as external parameters of the camera 10' through camera external calibration.

As for the camera external calibration, any one of various methods previously suggested in the related field is used, and detailed description thereof will be omitted in an exemplary embodiment of the present invention.

Rotation of the single camera 10' in the noncamera-centered 3D world coordinate system 2 may be defined to be a 3×3 matrix R as shown in Equation 26 below.

$$R = \begin{bmatrix} r_{xx} & r_{xy} & r_{xz} \\ r_{yx} & r_{yy} & r_{yz} \\ r_{zx} & r_{zy} & r_{zz} \end{bmatrix} \quad \text{[Equation 26]}$$

Also, movement of the single camera 10' in the noncamera-centered 3D world coordinate system 2 may be defined to be a 3×1 vector t as shown in Equation 27 below.

$$t = \begin{pmatrix} t_x \\ t_y \\ t_z \end{pmatrix} \quad \text{[Equation 27]}$$

When the single camera 10' rotates as much as the 3×3 matrix R and moves as much as the 3×1 vector t in the noncamera-centered 3D world coordinate system 2, an initial 3D trajectory $P_{initial}^{R,t}$ of the ball resulting from rotation and movement is acquired by converting an initial 3D trajectory $P_{initial}$ of the ball reconstructed in a camera-centered 3D world coordinate system 1 as shown in Equation 28 below.

$$P_{initial}^{R,t} = (W_0^{R,t}, W_1^{R,t}, W_2^{R,t}, \ldots, W_n^{R,t}) \quad \text{[Equation 28]}$$

Here, $W_0^{R,t}$ is 3D world coordinates of an initial starting point P0' of the ball in the noncamera-centered 3D world coordinate system 2 and acquired by converting Equation 29 below which shows a relationship with an initial starting point (P0) $W_0$ in the camera-centered 3D world coordinate system 1.

$$W_0 = R^{-1}(W_0^{R,t} - t) \quad \text{[Equation 29]}$$

Here, $W_1^{R,t}$ is a first passing point P1' of the ball in the noncamera-centered 3D world coordinate system 2 and acquired by converting Equation 30 below which shows a relationship with a first passing point (P1) $W_1$ in the camera-centered 3D world coordinate system 1.

$$W_1^{R,t} = R W_1 + t \quad \text{[Equation 30]}$$

Because of rotation, an initial 3D velocity $v^R$ of the ball may be acquired by converting Equation 31 below which shows a relationship with an initial 3D velocity v in the camera-centered 3D world coordinate system 1.

$$v^R = R v \quad \text{[Equation 31]}$$

As described above, even when the single camera 10' rotates as much as the 3×3 matrix R and moves as much as the 3×1 vector t in the noncamera-centered 3D world coordinate system 2, a focal length f and an optical center $(p_0, q_0)$ of the single camera 10' may be calculated through internal calibration of the single camera 10', and the initial starting point (P0) $W_0$ and the first passing point (P1) $W_1$ of the ball and 2D image coordinates $c_1, c_2, \ldots, c_n$ of center points of the ball may be measured in the camera-centered 3D world coordinate system 1. Then, it is possible to effectively and simultaneously reconstruct the initial 3D trajectory $P_{initial}^{R,t}$ and the initial 3D velocity $v^R$ of the ball in the noncamera-centered 3D world coordinate system 2 from the measured initial starting point (P0) $W_0$, first passing point (P1) $W_1$, and 2D image coordinates $c_1, c_2, \ldots, c_n$ on the basis of single camera images 20' acquired from the single camera 10'.

Figure 6:
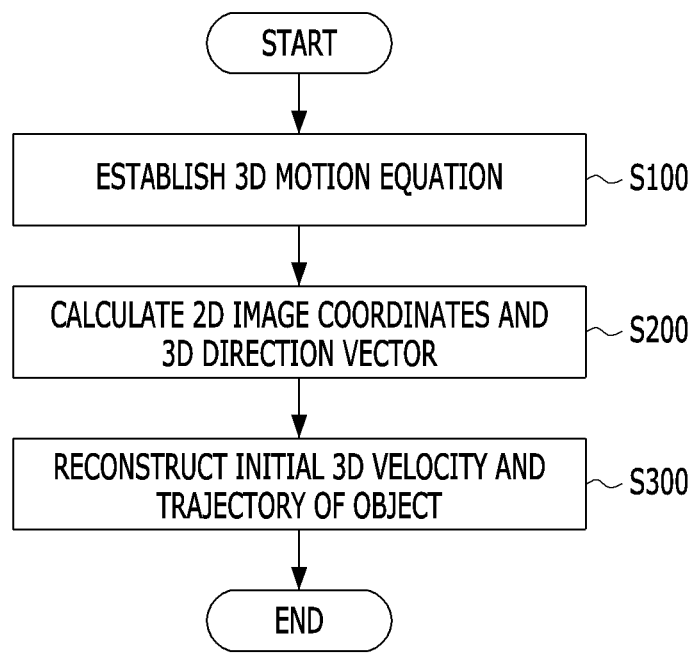
FIG. 6 is a flowchart illustrating a method of simultaneously reconstructing an initial 3D trajectory and velocity of an object by using single camera images according to an exemplary embodiment of the present invention.

FIG. 6 is a flowchart illustrating a method of simultaneously reconstructing an initial 3D trajectory and velocity of an object by using single camera images according to an exemplary embodiment of the present invention.

Referring to FIG. 6, the method includes an operation of establishing a 3D motion equation having an initial 3D velocity of an object and a depth of 3D world coordinates of the object as variables (S100), an operation of calculating 2D image coordinates of a passing point of the object by using photography information of a single camera, and calculating a 3D direction vector of the object (S200), and an operation of finding solutions to the 3D motion equation by using the 2D image coordinates and the 3D direction vector of the object, and reconstructing an initial 3D velocity and trajectory of the object (S300).

In operation S100, a 3D motion equation is established with regard to 3D world coordinates of object-passing points in an imaging range of a single camera and a distance between the object-passing points, and a linear system which is obtained by accumulating the 3D motion equation is defined by using 2D image coordinates and a 3D direction vector of an object calculated from 3D world coordinates of a starting point and an initial passing point of the object.

In operation S200, 2D image coordinates of the object are acquired by using optical center information of the single camera and 2D pixel coordinates of object-passing points detected when the object passes through the imaging range of the single camera.

In operation S200, a focal length of the single camera, an actual diameter of the object, a diameter of the object observed in an image captured by the single camera, and the 2D image coordinates are used to reconstruct 3D world coordinates of the object-passing points and calculate a 3D direction vector of the object.

In operation S300, depth values of 3D world coordinates of the object-passing points and an initial 3D velocity value of the object are simultaneously calculated to reconstruct an initial 3D trajectory and velocity of the object.

In operation S300, when the single camera is moved and rotated, the reconstructed 3D velocity and trajectory of the object are converted by using movement and rotation information to reconstruct an initial 3D trajectory and velocity in a noncamera-centered 3D world coordinate system.

The above description of the present invention is exemplary, and those of ordinary skill in the art should appreciate that the present invention can be easily carried out in other detailed forms without changing the technical spirit or essential characteristics of the present invention. Therefore, exemplary embodiments of the present invention describe rather than limit the technical spirit of the present invention, and the scope of the present invention is not limited by these embodiments. For example, each component described as a single type may be implemented in a distributed manner, and likewise, components described as being distributed may be implemented as a coupled type.

It should be noted that the scope of the present invention is defined by the claims rather than the description of the present invention, and the meanings and ranges of the claims and all modifications derived from the concept of equivalents thereof fall within the scope of the present invention.

The present invention described above may be embodied as computer-readable code on a program recording medium. The computer-readable medium includes all types of storage devices configured to store data that can be read by a computer system. Examples of the computer-readable medium include a hard disk drive (HDD), a solid-state drive (SSD), a silicon disk drive (SDD), a read-only memory (ROM), a random-access memory (RAM), a compact disc (CD)-ROM, a magnetic tape, a floppy disk, an optical data storage device, and the like. In addition, the computer-readable medium may be implemented in the form of a carrier wave (e.g., transmission through the Internet).

Figure 7:
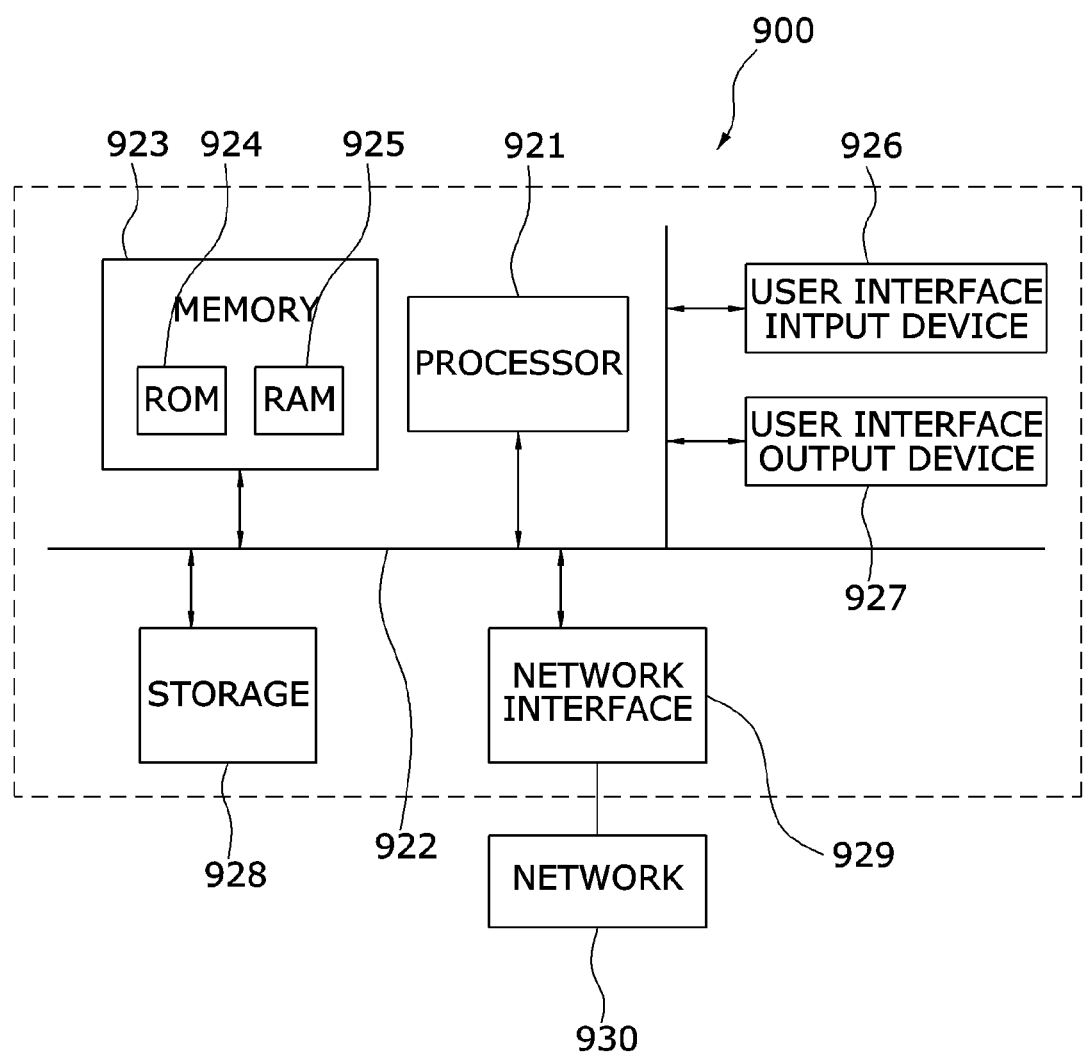
FIG. 7 is a view illustrating an example of a computer system in which a method according to an embodiment of the present invention is performed.

The method according to an embodiment of the present invention may be implemented in a computer system or may be recorded in a recording medium. FIG. 7 illustrates a simple embodiment of a computer system. As illustrated, the computer system may include one or more processors 921, a memory 923, a user input device 926, a data communication bus 922, a user output device 927, a storage 928, and the like. These components perform data communication through the data communication bus 922.

Also, the computer system may further include a network interface 929 coupled to a network. The processor 921 may be a central processing unit (CPU) or a semiconductor device that processes a command stored in the memory 923 and/or the storage 928.

The memory 923 and the storage 928 may include various types of volatile or non-volatile storage mediums. For example, the memory 923 may include a ROM 924 and a RAM 925.

Thus, the method according to an embodiment of the present invention may be implemented as a method that can be executable in the computer system. When the method according to an embodiment of the present invention is performed in the computer system, computer-readable commands may perform the producing method according to the present invention.

The method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

Further, the above description is to be considered illustrative rather than restrictive in all aspects. The scope of the invention is to be interpreted in a sense defined by the appended claims, and the present invention covers all modifications provided they come within the scope of the appended claims and their equivalents.

The system and method for simultaneously reconstructing an initial 3D trajectory and velocity of an object by using single camera images according to an exemplary embodiment of the present invention make it possible to simultaneously reconstruct an initial 3D trajectory and velocity of a ball required for 3D ball trajectory simulation by using single camera images captured by a single camera in a virtual ball sports system which enables a person to virtually experience and train for ball sports techniques such as a soccer kick, a golf shot, and the like.

According to the present invention, unlike an existing multi-camera method of tracking 2D positions of a ball in multiple camera images captured with multiple cameras which are mutually synchronized and mutually calibrated and then reconstructing an initial 3D trajectory and velocity of the ball through triangulation, only a single camera is used without complex mutual synchronization, mutual calibration, and triangulation processes, and it is possible to simultaneously reconstruct an initial trajectory and velocity of a ball by directly applying a 3D motion equation to 2D positions of the ball tracked in single camera images.

According to the present invention, it is possible to simultaneously reconstruct an initial 3D trajectory and velocity of an object (a ball) by directly applying a motion equation on the basis of kinematic principles such that the accuracy of a 3D trajectory and velocity of an object (a ball) may be effectively improved.

Effects of the present invention are not limited to those mentioned above, and other effects which are not described herein will be clearly understood by those of ordinary skill in the art from the above description.

Exemplary embodiments of the present invention have been described above. Those of ordinary skill in the art would appreciate that the present invention can be implemented in modified forms without departing from the fundamental characteristics of the present invention. Therefore, exemplary embodiments of the present invention should be construed as describing rather than limiting the present invention. It should be noted that the scope of the present invention is defined by the claims rather than the description of the present invention, and the meanings and ranges of the claims and all modifications derived from the concept of equivalents thereof fall within the scope of the present invention.

What is claimed is:

1. A system for simultaneously reconstructing an initial three-dimensional (3D) trajectory and velocity of an object by using single camera images, the system comprising:
    a single camera;
    storage; and
    a processor in communication with the single camera and the storage to process commands stored in the storage to provide:
        a receiver configured to receive 3D world coordinate information of a starting point of the object and object-captured image information of the single camera;
        a two-dimensional (2D) coordinate acquisition unit configured to acquire 2D image coordinates of the object from the object-captured image information; and
        a reconstructor configured to simultaneously reconstruct an initial 3D velocity and trajectory of the object by applying a 3D motion equation to the 3D world coordinate information of a starting point of the object, 2D image coordinates and a depth from the single camera to the object.

2. The system of claim 1, wherein the receiver receives the object-captured image information including information on a focal length of the single camera, an actual diameter of the object, and a diameter of the object observed in an image captured by the single camera.

3. The system of claim 1, wherein the 2D coordinate acquisition unit acquires the 2D image coordinates of the object by using optical center information of the single camera and 2D pixel coordinates of an object-passing point detected when the object passes through an imaging range of the single camera.

4. The system of claim 3, wherein the object-passing point is a passing point which is first detected when the object passes through the imaging range of the single camera after departure, and
    the depth is a distance between the object-passing point and the single camera.

5. The system of claim 3, wherein the reconstructor reconstructs 3D world coordinates of the object-passing point by using the 2D image coordinates and the object-captured image information.

6. The system of claim 5, wherein the 3D motion equation includes a direction vector of an object velocity calculated by using the 3D world coordinate information of the starting point of the object and the 3D world coordinates of the object-passing point and includes a depth of the 3D world coordinates and an initial 3D velocity of the object as variables, and
    the reconstructor simultaneously calculates a depth value of the 3D world coordinates of the object-passing point and an initial 3D velocity value of the object by using a linear system, which is obtained by accumulating 3D motion equations for consecutive object-passing points, to reconstruct the initial 3D trajectory and velocity of the object.

7. The system of claim 5, wherein the reconstructor converts the reconstructed initial 3D trajectory of the object and the reconstructed initial 3D velocity of the object by using movement and rotation information of the single camera to simultaneously reconstruct an initial 3D trajectory and velocity of the object in a noncamera-centered 3D world coordinate system.

8. A method of simultaneously reconstructing a three-dimensional (3D) trajectory and velocity of an object by using single camera images, the method comprising:
    establishing a 3D motion equation having an initial 3D velocity of the object and a depth of 3D world coordinates of the object as variables;
    calculating two-dimensional (2D) image coordinates of an object-passing point by using photography information of a single camera, and calculating a 3D direction vector of the object; and
    finding solutions to the 3D motion equation by using the 2D image coordinates and the 3D direction vector of the object, and reconstructing an initial 3D velocity and trajectory of the object.

9. The method of claim 8, wherein establishing the 3D motion equation comprises establishing the 3D motion equation with regard to 3D world coordinates of object-passing points in an imaging range of the single camera and a distance between the object-passing points, and defining a linear system, which is obtained by accumulating the 3D motion equation, by using the 2D image coordinates and a 3D direction vector calculated from 3D world coordinates of a starting point of the object and 3D world coordinates of an initial object-passing point.

10. The method of claim 8, wherein calculating two-dimensional (2D) image coordinates comprises acquiring the 2D image coordinates of the object-passing point by using optical center information of the single camera and 2D pixel coordinates of the object-passing point detected when the object passes through an imaging range of the single camera.

11. The method of claim 10, wherein calculating two-dimensional (2D) image coordinates comprises reconstructing 3D world coordinates of the object-passing point by using the 2D image coordinates and information on a focal length of the single camera, an actual diameter of the object, and a diameter of the object observed in an image captured by the single camera, and calculating the 3D direction vector of the object.

12. The method of claim 8, wherein finding solutions to the 3D motion equation comprises simultaneously calculating a depth value of 3D world coordinates of the object-passing point and an initial 3D velocity value of the object to reconstruct the initial 3D trajectory and velocity of the object.

13. The method of claim 8, wherein finding solutions to the 3D motion equation comprises, when the single camera is moved and rotated, converting the reconstructed 3D velocity and trajectory of the object by using movement and rotation information to reconstruct an initial 3D trajectory and velocity of the object in a noncamera-centered 3D world coordinate system.

* * * * *